May 30, 1950 — E. SABALLUS — 2,509,456
AUTOMATIC RESTRICTION VALVE
Filed March 19, 1949 — 2 Sheets-Sheet 1
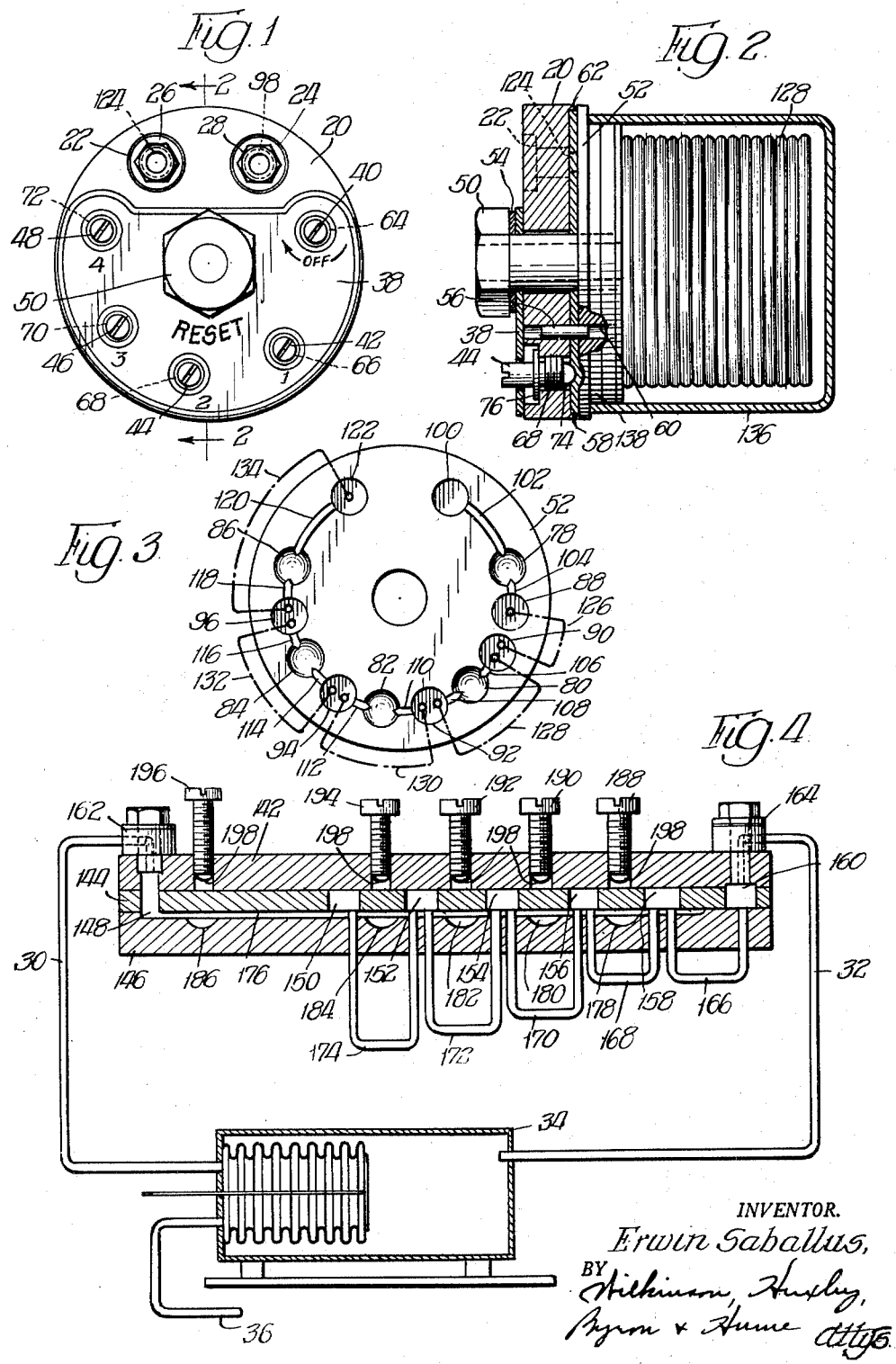
INVENTOR.
Erwin Saballus,
BY Wilkinson, Huxley,
Byron & Hume ATTYS.

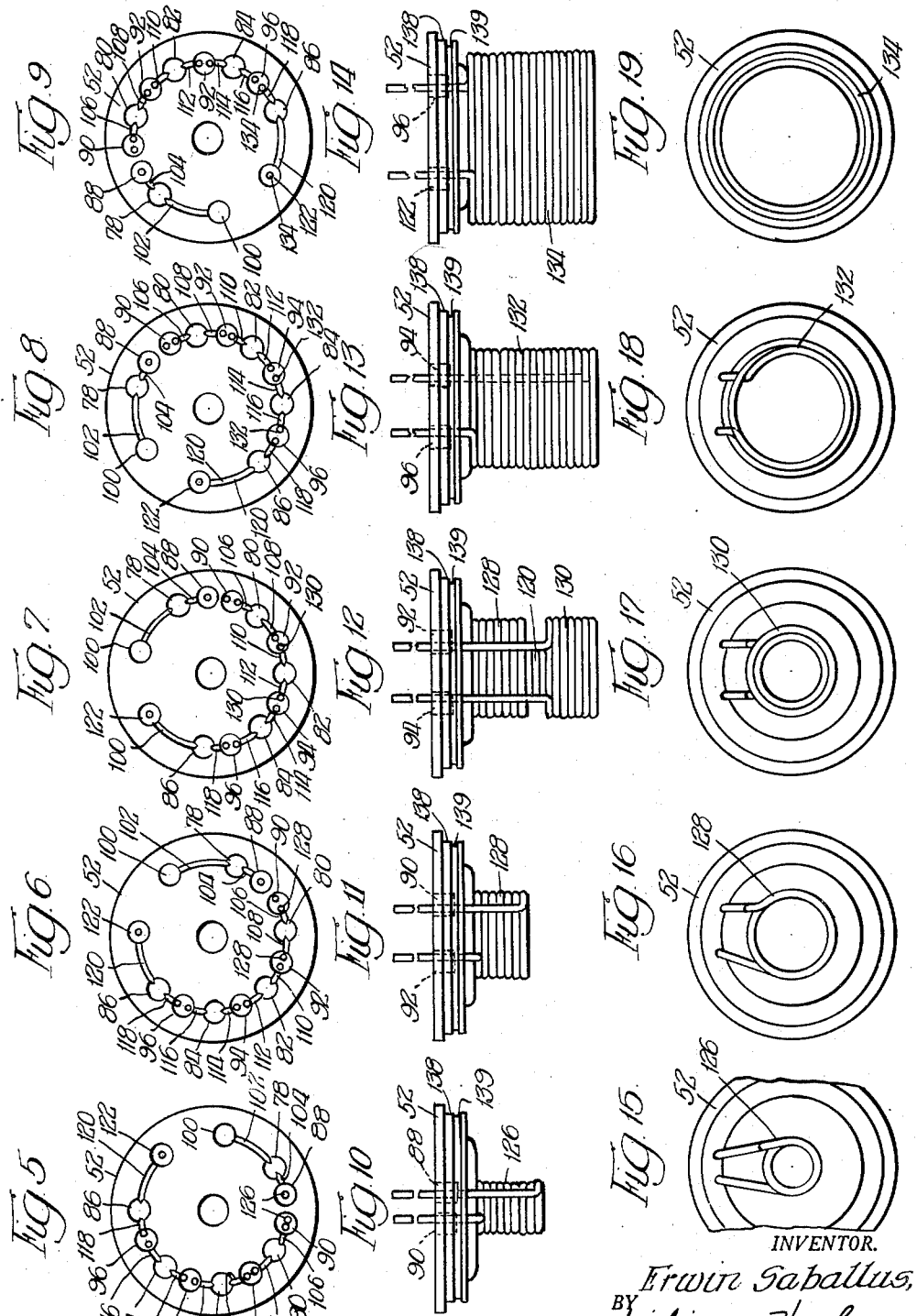

Patented May 30, 1950

2,509,456

UNITED STATES PATENT OFFICE 2,509,456

AUTOMATIC RESTRICTION VALVE

Erwin Saballus, Chicago, Ill., assignor to The Powers Regulator Company, Chicago, Ill., a corporation of Illinois Application March 19, 1949, Serial No. 82,328

9 Claims. (Cl. 277—70)

This invention relates to valve mechanism and more particularly to valve mechanism for varying fluid flow in predetermined amounts utilizing flow areas of substantially constant section.

In pneumatic control instruments and related devices, particularly of the reset type such as disclosed in Patents No. 1,985,829, Hubbard and Re. 20,092, Mason, it is desirable to employ automatic reset restriction valves which may be selectively operated to vary the delivery of fluid therethrough. Such a reset control system utilizes a damping arrangement including an orifice which is preferably adjustable so that the damping time can be changed at will to compensate for various time lags encountered in service.

There are other mechanisms which require accurate throttling valves such as pilot valve controls. In the past, such control of a small flow of air or gas has usually been effected by the use of a needle valve. However, the results obtained by the use of such needle valves are not uniform and a given setting of a needle valve does not always give uniformly reproducible results. Furthermore, such needle valves occasionally clog owing to dust and other foreign matter which collects therein from the air or gas passing therethrough, and commercially it is difficult to make control valves which are alike.

It is thus an object of this invention to provide an adjustable orifice or vernier valve of such construction that it can be calibrated for adjustment, and for each such adjustment, conditions are always substantially reproducible.

Another object of the invention is to provide an adjustable orifice or vernier valve of simple inexpensive construction whereby such valves can be manufactured with a high degree of uniformity and at low cost.

Another object of the invention is to provide a valve wherein the rate of flow therethrough is controlled by capillary tubing whereby the flow area of the valve is constant.

Another object of the invention is to provide a valve which is predetermined so that there are a number of rates of flow therethrough as distinguished from a valve adjustable for an infinite number of rates of flow.

Another object of the invention is to provide a valve so constructed that fluid flowing therethrough passes through passages of varying lengths, the passages being arranged in series whereby effective passages of varying lengths may be selected.

Another object of the invention is to provide a valve wherein fluid flow passages are provided by tubings of the same internal diameter but of selected lengths.

Another object of the invention is to provide a valve wherein flow is directed through tubings of selected length, the selection of the tubings being by a valve comprising a flexible, resilient diaphragm.

With these and various other objects in view, the invention consists of certain novel features of construction and operation as will be more fully described and particularly pointed out in the specification, drawings and claims appended hereto.

In the drawings which illustrate embodiments of the device and wherein like reference characters are used to designate like parts:

Figure 1 is a top plan view of a reset restriction valve assembly embodying the invention;

Figure 2 is a sectional elevation of the valve assembly illustrated in Figure 1, the section being taken substantially in the plane as indicated by the line 2—2 of Figure 1;

Figure 3 is a top plan view of the terminal block assembly of the valve illustrated in Figures 1 and 2, the tubings of different length being indicated diagrammatically;

Figure 4 is a schematic diagram of the reset restriction valve embodying the invention, showing the valve connected to throttling mechanism;

Figures 5 to 9, inclusive, are top plan views illustrating the position of the terminal block of the valve during the five successive operations in positioning and securing the tubings in place;

Figures 10 to 14, inclusive, are side elevations of the terminal block showing the successive five steps in the application of the tubings, said figures corresponding, respectively, to Figures 5 to 9, inclusive; and Figures 15 to 19, inclusive, are bottom plan views of the assemblies shown in Figures 10 to 14, inclusive.

Referring first of all, more particularly, to the valve assembly as illustrated in Figures 1 to 3, and 5 to 19, inclusive, the valve assembly comprises the top plate 20 having openings or apertures 22 and 24 adapted to be provided with couplings such as shown in Figure 1 at 26 and 28, the couplings being adapted to be connected as through tubing 30 and 32 (Figure 4) to throttling mechanism illustrated generally at 34, which in turn is connected through a pipe 36 to return line pressure. For convenience of reference in this application, the opening 22 will be termed the inlet and opening 24 will be termed the outlet, it being understood, of course, that either may be an inlet or an outlet.

Indicating or name plate 38 is disposed on the cover plate 20, having apertures through which valve stems of valves 40, 42, 44, 46 and 48 extend, and said plate 38 is secured by the clamp screw 50 which also serves to secure the cover plate 20 to the terminal block 52, gasket 54 being interposed between the head of the clamp screw 50 and the indicating plate 38. The cover plate 20 is also provided with the positioning pin 56 which passes through a suitable aperture provided in the resilient gasket or diaphragm 58 and is received in socket or passage 60 provided in the terminal block 52. The diaphragm 58 is preferably oil proof and may be of any suitable material such as synthetic rubber. The diaphragm 58 is clamped in position by means of the clamp screw 50 which passes therethrough and is retained peripherally by an outer depending flange 62 provided on the cover plate 20.

Valve stems of valves 40, 42, 44, 46 and 48 are provided with valve bodies 64, 66, 68, 70 and 72, respectively, suitably threaded in the cover 20, rotation of the valve bodies moving the rounded tips 74 (Figure 2) toward and away from the diaphragm 58, the lower and upper extreme positions of the tips 74 being limited as by flange 76 (Figure 2). In the lower-most position the tip 74 will depress the diaphragm into rounded depressions 78, 80, 82, 84 and 86 aligned, respectively, with valves 40, 42, 44, 46 and 48. The block 52 is also counterbored or recessed as at 88, 90, 92, 94 and 96, depressions 78, 80, 82, 84 and 86, and the openings 22 and 24 being preferably arranged on the circumference of a common circle and all being of substantially the same diameter.

In the valve illustrated in Figures 1 to 3, inclusive, and 5 to 19, inclusive, opening 24 is connected through an aperture 98 in diaphragm 58 to a recess 100 in block 52 which in turn is connected to depression 78 by means of a passage or channel 102. Depression 78 is connected to recess 88 by means of channel 104 but there is no connecting channel between recess 88 and 90 as shown in these figures.

Channel 106 connects recess 90 with depression 80, and channel 108 connects depression 80 with recess 92. Channel 110 connects recess 92 with depression 82 and channel 112 connects depression 82 with recess 94. Channel 114 connects depression 94 with recess 84 and channel 116 connects depression 84 with recess 96. Channel 118 connects recess 96 with depression 86 and channel 120 connects depression 86 with recess 122 which is connected to aperture 22 through aperture 124 in diaphragm 58. These channels are of relatively large cross sectional area compared to that of the capillary tubing, and are preferably on the periphery of the circle through the centers of the depressions and recesses.

In order to provide variations in reset resistance the recesses are connected with capillary tubing such as .060 inch outside diameter by .018 inch inside diameter in the modification shown, the channels being preferably of so much greater capacity than the capillary tubing that they can be considered as having no resistance.

In the manufacture of the valve assembly the terminal block and tubing are assembled conveniently as illustrated in Figures 5 to 19, inclusive, in which the first operation is illustrated in Figures 5, 10 and 15. In the first operation the tubing 126 is disposed so that one end is located in recess 88, and the tube is provided with approximately eight turns, the other end being located in recess 90.

In the second operation, as illustrated in Figures 6, 11 and 16, tubing 128 is coiled around tubing 126 for approximately six turns, one end thereof being disposed in recess 90 while the other end is disposed in recess 92. In the third operation, as illustrated in Figures 7, 12 and 17, tubing 130 is disposed with substantially fourteen turns (two layers of seven turns each) around the lower part of tubing 126, one end of tubing 130 being disposed in recess 92 while the other end is disposed in recess 94. In the fourth operation, as illustrated in Figures 8, 13 and 18, tubing 132 is disposed around tubing 126, 128 and 130 for approximately eighteen turns, one end of said tubing being disposed in said recess 94 while the other end is disposed in recess 96. In the fifth operation, as illustrated in Figures 9, 14 and 19, tubing 134 is disposed around tubing 132 for approximately twenty-eight turns (two layers of fourteen turns each), one end of said tubing being disposed in recess 96 while the other end is disposed in recess 122.

After all of the tubes are inserted and properly positioned in their respective recesses, they are soldered therein in an air-tight relation to the terminal block 52 and the ends of the tubings are broken off within the recesses so that they do not extend above the top surface of the block 52. The tubing part of the valve assembly is then closed by means of the coil cover 136 (Figure 2) which is snapped on to the depending cylindrical portion 138 of block 52, a portion of the cover having a dimple or projection (not shown), interlocking in recess 139.

As an example of the various lengths of the tubing, in one embodiment of the invention in use, tubing 126 is twelve inches long, tubing 128 is seventeen inches long, tubing 130 is thirty-one inches long, tubing 132 is fifty-nine inches long, while tubing 134 is one hundred and fifteen inches long. Thus, in the valve illustrated in Figures 1 to 3, and 5 to 19, inclusive, when all of the valves 40, 42, 44, 46 and 48, are in open position, that is, are raised so that the diaphragm 58 is not depressed in the depressions, all of the tubing is bypassed with the exception of tubing 126, so that there is a connection between opening 22, recess 122, the successive arcuate channels, and the respective depressions and recesses until recess 90 is reached. The connection is then through tubing 126 to recess 88, and from said recess through channel 104, recess 78, and channel 102 to recess 100 and outlet 24. By depressing the selected valves 42, 44, 46 and 48, different series arrangements may be made, the depression of valve 40 serving to render the valve assembly inoperative. The more tubing used, the more the pneumatic resistance.

In Figure 4 the terminal block assembly of the system is schematically illustrated, the assembly comprising the cover 142 (corresponding to cover 20), the flexible, resilient diaphragm 144 corresponding to diaphragm 58, being fixed between the cover and the terminal block 146 (corresponding to block 52).

In this form the diaphragm 144 is shown as being provided with apertures 148, 150, 152, 154, 156, 158 and 160, apertures 148 and 150 communicating with the couplings 162 (corresponding to coupling 28) and 164 (corresponding to coupling 26), respectively. These apertures correspond to the recesses in the terminal block 52.

Capillary tube 166 has its ends secured in the block 146 and communicates through one end with aperture 160, the other end of said capillary tube communicating with aperture 158. Capillary tube 166 and the subsequently described tubes are secured in the same manner as those above described. Capillary tube 168 is secured in block 146 having one end communicating with aperture 158, while the other end communicates with aperture 156. Capillary tube 170 is likewise secured in block 146 having one end communicating with aperture 156 while the other end communicates with aperture 154. Capillary tube 172 is also secured in block 146 and has one end communicating with aperture 154 while the other end communicates with aperture 152. Capillary tube 174 is secured in block 146 having one end communicating with aperture 152 and the other end communicating with aperture 150. Apertures 158, 156, 154, 152, 150 and 148 are connected by means of a capillary channel 176, preferably of much greater cross sectional area than that of the bore area of the capillary tubing.

Depressions 178, 180, 182, 184 and 186 are provided in the block 146, respectively, disposed between the successive apertures 158, 156, 154, 152, 150 and 148. Cover 142 is provided with a valve 188 threaded therein and being aligned with depression 178, said valve being adapted to depress a portion of the diaphragm 144 into depression 178 to cut off communication between apertures 158 and 156 through a portion of channel 176, causing communication to be through capillary tube 168. Valves 190, 192, 194 and 196 are similarly mounted with respect to their depressions 180, 182, 184 and 186, respectively, and are adapted to depress a portion of the diaphragm 144 into their depressions 180, 182, 184 and 186, respectively, all of said valves being provided with rounded ends 198 to cause the diaphragm to conform to the respective depressions whereby in depressed condition the valves close communication through their controlled portions of channel 176. It will thus be seen that if valve 196 is closed, that is, the diaphragm is depressed into depression 186, communication between couplings 162 and 164 is cut off and the valve assembly is inoperative. If valve 196 is open, but only valve 188 is closed, communication between coupling 162 and 164 is through recess 148, channel 176, capillary tube 168, aperture 158, capillary tube 166, aperture 160 to coupling 164. Similarly closing valves 194, 192 or 190 causes communication to be had through the adjacent capillary tubes, which may be of selective lengths, to provide the desired pneumatic resistance. As before, a suitable dial may be provided to indicate the number of the control valve so that the valve assembly can be properly operated to select the desired serial connections between the tubings.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a valve assembly, the combination of a top plate, a terminal block, a flexible, resilient diaphragm secured between said plate and block, said block having an inlet recess and an outlet recess, recesses disposed between said inlet and outlet recesses, capillary tubings connecting certain of said recesses, said block having channels connecting certain of said recesses, and valve members carried by said top plate operable to deform said diaphragm to close the adjacent channel thereby closing communication through said channel between the recesses it connects whereby the capillary tube between said last named recesses is the only communication therebetween.

2. In a valve assembly, the combination of a circular top plate, a circular terminal block of substantially the same diameter as said top plate, a flexible, resilient diaphragm secured between said plate and block, circular recesses disposed in said block in spaced apart relation to each other, segmentally spherical depressions disposed in said block between certain of said recesses, said recesses and depressions being substantially of the same diameter in the top plane of said block and on a common circle, channels connecting certain of said recesses and depressions, capillary tubings of different lengths connecting certain of said recesses, and valve members in said top plate disposed in alignment with said depressions and movable to depress said diaphragm into the selected depression to thereby render inoperative the channels connecting said last named depression with the adjacent recesses whereby communication only can be had through the capillary tubing connecting said last named recesses.

3. In a valve assembly, the combination of a top plate, a terminal block of substantially the same size as said top plate, a flexible, resilient diaphragm secured between said plate and block, recesses disposed in said block in spaced apart relation to each other, depressions disposed in said block between certain of said recesses, said recesses and depressions being substantially of the same area in the top plane of said block, channels connecting certain of said recesses and depressions, capillary tubings of different lengths connecting certain of said recesses, and valve members in said top plate disposed in alignment with said depressions and movable to depress said diaphragm into the selected depression to thereby render inoperative the channels connecting said last named depression with the adjacent recesses whereby communication only can be had through the capillary tubing connecting said last named recesses.

4. In a valve assembly, the combination of a circular top plate, a circular terminal block of substantially the same diameter as said top plate, a flexible, resilient diaphragm secured between said plate and block, circular recesses disposed in said block in spaced apart relation to each other, segmentally spherical depressions disposed in said block between certain of said recesses, said recesses and depressions being substantially of the same diameter in the top plane of said block and on a common circle, channels connecting certain of said recesses and depressions, capillary tubings of different lengths connecting certain of said recesses, the ends of said capillary tubings in said recesses being below said top plane, and valve members in said top plate disposed in alignment with said depressions and movable to depress said diaphragm into the selected depression to thereby render inoperative the channels connecting said last named depression with the adjacent recesses whereby communication only can be had through the capillary tubing connecting said last named recesses.

5. In a valve assembly, the combination of a circular top plate, a circular terminal block of substantially the same diameter as said top plate, a flexible, resilient diaphragm secured between said plate and block, an inlet circular recess and an outlet circular recess disposed in said block, other circular recesses being disposed between said inlet and outlet recesses in spaced apart relation thereto and to each other, segmentally spherical depressions disposed in said block between certain of said recesses, said recesses and depressions being substantially of the same diameter in the top plane of said block and on a common circle, channels connecting certain of said recesses and depressions, capillary tubings of different lengths connecting certain of said recesses, the ends of said capillary tubings in said recesses being below said top plane, said top plate having an inlet and an outlet respectively connected to said inlet and outlet recesses through apertures in said diaphragm, and valve members in said top plate disposed in alignment with said depressions and having spherical ends complementary to the spherical depressions and movable to depress said diaphragm into the selected depression to thereby render inoperative the channels connecting said last named depression with the adjacent recesses whereby communication only can be had through the capillary tubing connecting said last named recesses.

6. In a valve assembly, the combination of a top plate, a terminal block, a flexible, resilient diaphragm secured between said plate and block, an inlet recess and an outlet recess disposed in said block, other recesses being disposed between said inlet and outlet recesses in spaced apart relation thereto and to each other, depressions disposed in said block between certain of said recesses, channels connecting certain of said recesses and depressions, capillary tubings of different lengths connecting certain of said recesses, the ends of said capillary tubings in said recesses being below said top plane, said top plate having an inlet and an outlet respectively connected to said inlet and outlet recesses through apertures in said diaphragm, and valve members in said top plane disposed in alignment with said depressions and movable to depress said diaphragm into the selected depression to thereby render inoperative the channels connecting said last named depression with the adjacent recesses whereby communication only can be had through the capillary tubing connecting said last named recesses.

7. In a valve assembly, the combination of a top plate, a terminal block, a flexible, resilient diaphragm secured between said plate and block, said block having an inlet recess and an outlet recess, recesses in said block disposed between said inlet and outlet recesses, an inlet and outlet provided in said plate and respectively connected to said inlet and outlet recesses, capillary tubings connecting certain of said recesses, means shorter than said tubings connecting certain of said recesses, and valve members carried by said top plate operable to deform said diaphragm to close the adjacent means thereby closing communication through said means between the recesses connected thereby, whereby the capillary tube between said last named recesses is the only communication therebetween.

8. In a valve assembly, the combination of a top plate, a terminal block, a flexible, resilient diaphragm secured between said plate and block, said block having recesses disposed therein, capillary tubing connecting said recesses, means by-passing said tubing for connecting said recesses, and a valve member operable to deform said diaphragm to close the means thereby closing the by-pass between recesses, whereby the capillary tube between said recesses is the only communication therebetween.

9. In a valve assembly, the combination of a top plate, a terminal block, a flexible, resilient diaphragm secured between said plate and block, said block having an inlet recess and an outlet recess, recesses disposed between said inlet and outlet recesses, an inlet and outlet provided in said plate and respectively connected to said inlet and outlet recess through said diaphragm, capillary tubings of different lengths connecting certain of said recesses, the ends of said tubings in said recesses being below the top surface of said block, said block having channels connecting certain of said recesses, and valve members carried by said top plate operable to deform said diaphragm to close the adjacent channel thereby closing communication through said channel between the recesses it connects whereby the capillary tube between said last named recesses is the only communication therebetween.

ERWIN SABALLUS.

REFERENCES CITED

The following references are of record in the file of this patent:

UNITED STATES PATENTS

| Number | Name | Date |
|---|---|---|
| 2,187,465 | Simoniek | Jan. 16, 1940 |
| 2,413,584 | Side | Dec. 31, 1946 |
| 2,441,044 | Tate | May 4, 1948 |

Certificate of Correction

Patent No. 2,509,456 May 30, 1950

ERWIN SABALLUS

It is hereby certified that error appears in the printed specification of the above numbered patent requiring correction as follows:

Column 4, line 63, for the reference numeral "150" read *160*;

and that the said Letters Patent should be read with this correction therein that the same may conform to the record of the case in the Patent Office.

Signed and sealed this 22nd day of August, A. D. 1950.

[SEAL]

THOMAS F. MURPHY,
*Assistant Commissioner of Patents.*